United States Patent
Hilmas et al.

(10) Patent No.: US 8,715,803 B2
(45) Date of Patent: May 6, 2014

(54) CERAMIC WELDS, AND A METHOD FOR PRODUCING THE SAME

(76) Inventors: Gregory Eugene Hilmas, Rolla, MO (US); William Gene Fahrenholtz, Rolla, MO (US); Jeremy Lee Watts, Rolla, MO (US); Harlan James Brown-Shaklee, Rolla, MO (US)

( * ) Notice: Subject to any disclaimer, the term of this patent is extended or adjusted under 35 U.S.C. 154(b) by 378 days.

(21) Appl. No.: 13/168,243

(22) Filed: Jun. 24, 2011

(65) Prior Publication Data

US 2012/0164411 A1    Jun. 28, 2012

Related U.S. Application Data

(60) Provisional application No. 61/358,745, filed on Jun. 25, 2010.

(51) Int. Cl.
*B32B 7/04* (2006.01)
*B32B 18/00* (2006.01)

(52) U.S. Cl.
USPC .................. 428/57; 428/689; 428/698

(58) Field of Classification Search
USPC ............................. 428/57, 689, 698
See application file for complete search history.

(56) References Cited

U.S. PATENT DOCUMENTS 5,073,461 A * 12/1991 DeKoven et al. ............. 428/698

* cited by examiner

*Primary Examiner* — Brent O'Hern
(74) *Attorney, Agent, or Firm* — C. John Brannon; Brannon Sowers & Cracraft PC (57) ABSTRACT

A method of producing a ceramic weld, including identifying a ceramic first surface and a ceramic second surface to be bonded together, maintaining a non-oxidizing atmosphere over the first and second surfaces, and engaging the first and second surfaces to define a joint. An arc is generated between an electrode and the joint to create a liquid phase, and the liquid phase is cooled to yield a solid fusion layer, wherein the first and second surfaces are joined in the fusion layer.

5 Claims, 8 Drawing Sheets

CERAMIC WELDS, AND A METHOD FOR PRODUCING THE SAME

CROSS-REFERENCE TO RELATED APPLICATIONS

This patent application claims priority to co-pending U.S. provisional patent application Ser. No. 61/358,745, filed on Jun. 25, 2010.

TECHNICAL FIELD

The present novel technology relates generally to the field of materials science and, more particularly, to a method for welding ceramic bodies together.

BACKGROUND

Ceramics are inherently brittle materials. While very strong under compression, ceramic materials are typically weak under tension and torsional stresses. Thus, while ceramic materials generally exhibit high elastic moduli values, they are prone to brittle fracture and thermal shock.

Ceramic materials are typically joined together through the application of a cement. While this technique works well for joining two ceramic materials together, it is less useful for joining a ceramic to another material, such as a structural metal body, that has a substantially different coefficient of thermal expansion. Further, cements are less useful for joining materials that will experience significant tension or flexure, since cements are also prone to brittle fracture.

Further, as-formed ceramic bodies are typically limited to simple shapes, both because it is difficult to cast or form ceramic materials directly into complex shapes and it is equally difficult to machine brittle bodies into complex shapes after they are formed. Attempts have been made to produce ceramic bodies having complex shapes, such as by cementing or otherwise fastening the simple bodies together. Only limited success has been achieved to date using cements, due to their likewise inherent brittleness. Glues likewise do not offer sufficient bond strength to connect ceramics into more complex shapes. The use of fasteners, such as screws or bolts, is likewise limited because drilling holes through brittle ceramics introduces cracks that act as stress concentrators, thus giving rise to failure mechanisms in the ceramic bodies. Further, the fasteners themselves become focal points for stress concentration.

Welding ceramic bodies to themselves or to non-ceramics has thus far met with little success. The welding process typically includes the application of heat to the ceramic, thus introducing microcracks through thermal shock. Such ceramic welds have been hard to form, and those that have been formed have had very low bond strength.

Thus, there remains a need for a method of welding ceramic bodies together and/or to non-ceramic bodies, without experiencing detrimental thermal shock or other damage at and around the weld site. The present invention addresses this need.

SUMMARY

The present novel technology relates generally to materials science. One object of the present novel technology is to provide an improved method of joining two ceramic bodies. Related objects and advantages will be apparent from the following description.

DETAILED DESCRIPTION

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

FIGS. 1-8 illustrate a first embodiment of the present novel technology, a method for joining electrically conductive ceramics and ceramic composites by arc welding 10. Ceramics are inherently brittle materials that are susceptible to thermal shock during the rapid heating and cooling cycles encountered during fusion welding. The application of properly selected preheat and postheat treatments enables the joining of conductive ceramics and ceramic composites to themselves as well as to metal structures. The novel joining process 10 enables the joining of components 15 of varied size from hot pressed, PVD, sputtered, CVD, plasma deposited, arc cast, sintered, and the like, ceramics, cermets, and ceramic matrix composites. Ceramic welding 10 enables the production of large, complex compound forms 20 from precursor bodies 10 having the simple shapes that are common of sintered and hot pressed ceramics, while retaining the strength and toughness inherent in the starting materials. The novel welding process 10 can produce joints that exhibit the same thermophysical and mechanical behavior as the parent material. In addition, arc welded joints 25 are able to withstand the same chemically corrosive, oxidizing atmospheres, and high temperature environments as the materials of the parent bodies 15.

Some potential uses include joining 10 of thermal protection systems (TPS) to structural components, producing exotic thermocouples, repairing and producing hybrid ballistic armor systems, joining of wear resistant or heat resistant surfaces to load bearing components such as those found in engines (internal combustion, Stirling, and turbine), joining refractory solar-absorptive ceramic surfaces to structural components for concentrated solar thermal applications, joining of wear resistant components to refractory alloys to produce bearings for high temperature applications (>1000° C.), and the like. Ceramic welding 10 enables the production of complex shapes 20 from simple hot pressed and sintered shapes 15. The precursor bodies 15 are typically nearly theoretically dense, more typically at least about 98% dense (no more than 2% porosity), still more typically at least 99% dense (no more than 1% porous), yet more typically at least 99.5% dense (no more than 0.5% porosity), and still more typically at least about 99.9% dense no more than 0.1% porosity). The ability to weld 10 simple shapes 15 into more complex structures 20 reduces machining costs and decreases the time required to achieve a finished component 20. In some cases, ceramic welding 10 is useful for improving mechanical behavior by refining grain sizes and producing thermodynamically stable grain boundaries which form from the melt in the joint region 25. Ceramic welding 10 also enables the repair of ceramic components 15 and composite structures 20.

Ceramics generally exhibit high elastic moduli values and are susceptible to brittle fracture and thermal shock. In order to minimize mechanical failure arising from thermal shock of large components 15 during the fusion welding process 10, the precursors 15 are subjected to a preheating thermal profile 30 and the compound structures so formed are subjected to a post-welding thermal profile 35, as, in general, ceramic materials lack the sufficiently high thermal shock resistance and/or significant ductility below the system's melting temperature to avoid material failure from thermal shock. Alternately, the properties of the precursor pieces 15 may be tailored to have very low coefficients of thermal expansion and/or sufficiently high ductility to offer superior thermal shock resistance. The temperature and duration of pre- and post-heating treatments 30, 35 are different for each material. In order to predetermine the preheat and the post-weld profiles, the minimum temperatures required to plastically relieve stresses are investigated. Each ceramic, ceramic particle composite, ceramic matrix composite, or cermet system 15 is characterized by its ability to relieve stresses that accumulate during the novel welding process 10. Processes lending to stress relief at high temperature include microcracking, grain boundary sliding or softening, dislocation motion, twinning, grain growth, recrystallization, combinations thereof, and the like. The pre- and post-heat treatment profiles 30, 35 are influenced by the temperatures at which appreciable stress relief occur by the aforementioned mechanisms.

In general, dislocation motion, twinning, grain growth and recrystallization occur at or above a homologous temperature $(T_H=T/T_m)$ of $T_H\approx0.4$-$0.5$. For materials exhibiting grain boundary softening, microcracking, and grain boundary sliding, the pre- and post-heat treatment 30, 35 temperature will be largely influenced by precursor body 15 composition and material processing before welding 10. To minimize the variability of the high temperature plasticity found in ceramics, it may be useful to conduct characterization (such as mechanical testing, neutron or x-ray diffraction, or the like) studies of the materials to be welded at high temperature prior to welding to identify the proper pre- and post-heat conditions 30, 35 for the specific component bodies 15. These studies will be unnecessary if it is possible to conduct welding trials and/or if plastic deformation occurs at temperature slightly above $T_H\approx0.4$-$0.5$.

In general, large component bodies 15 are preheated 30 to higher temperatures to prevent warping and cracking. More typically, for larger precursor bodies 15 lower heating and cooling ramp rates are chosen for the preheat and post-weld thermal profiles 30, 35. Further, conductive ceramics often are susceptible to oxidation at high temperature, so conductive ceramic precursor bodies 15 are typically shielded from oxidizing conditions at elevated temperatures in order to preserve the integrity of the component 15.

Welding 10 of conductive ceramics, ceramic composites, and cermets is achieved through the application of adequate heat 40 to create a fusion zone 45, typically consisting of a liquid phase. The fusion zone 45 can be created by an electric arc 40 between a consumable or non-consumable electrode 50 and the parent material 15 or unwelded parent material joint 55. While the examples and discussion herein focus on electrothermal means 80 of producing a fusion zone 45, other heat application techniques 80 may likewise be selected. When using a non-consumable electrode 50, the polarity of the electrode 50 is typically negative or alternating (as in alternating current), but may be positive. It is typically unnecessary to use alternating current when performing welds 10 of clean joints under adequate shielding gas. Typically, components 15 susceptible to reaction with oxygen or nitrogen, and in some cases, carbon, are shielded by performing arc welding 10 under a blanket 60 of a reducing, inert, hydrogen gas or any gas mixture thereof to maintain arc stability and non-oxidizing atmosphere.

Ceramics, ceramic composites, ceramic matrix composites, and cermets are prone to thermal shock during the welding cycle. To mitigate thermal shock and warping, ceramics precursor bodies 15 are typically heated to a temperature near $T_H\approx0.5$ ($T_H=T/T_M$, where $T_H$ is the homologous temperature, T is the component temperature in Kelvin, and $T_M$ is the melting temperature of the stress relieving phase in Kelvin). The proximity to this temperature will depend on the thermal shock resistance of the parent materials 15 to be welded and the size of the component 15. For example, monolithic particle composite bodies 15 containing $ZrB_2$-30 v/o SiC, ZrB2-B4C—SiC, or the like, are typically preheated 30 to ~1400K to prevent extensive warping and cracking during the welding cycle 10. This preheat temperature 30 substantially minimizes or prevents cracking because stresses can be relieved once the component reaches ~1700K.

Particle composites of $ZrB_2$—SiC and $HfB_2$—SiC 15, when processed by hot pressing and containing microstructural features characterized by 1-5 micron grains, are capable of withstanding heat fluxes in excess of 350 W/cm². This heat flux is used to simulate atmospheric reentry of hypersonic vehicles. While $ZrB_2$-30 v/o SiC bodies can withstand heat fluxes of 350 W/cm², they are susceptible to thermal shock with the heat fluxes encountered during arc welding. Measurement and simulation indicates that the heat flux generated by a 100 Amp arc from a ⅛" electrode exceeds 2000 W/cm². Thermal shock of 3 mm thick-25 mm diameter ceramic composite specimens 15 generally occurs during the initial heat up by the 100 Amp arc, while thermal shock is prevented in larger diameter specimens if the specimen 15 is heated above 1300K. This indicates that a preheat in excess of 1300K is typical to successfully weld 10 ceramics structures 15 larger than 1500 mm² and 3 mm thick without thermal shock cracking.

The preheat profile 30 required to weld 10 ceramic bearing components 15 in excess of 25 mm diameter can be accomplished by conduction of heat 40 from a heated substrate or absorption of incident radiation from arc heating, resistance heating, microwave heating, induction heating, exothermic chemical heating, photon heating, ion recombination (as in the recombination of $H^+$ and $H^-$ ions but not limited to hydrogen) or any combination of the aforementioned. For ceramics bearing material precursor bodies 15 prone to reaction with oxygen, carbon, nitrogen, hydrogen or any other reactive gas, it is typical for said material to achieve preheat 30 under an inert or non-oxidizing gas atmosphere blanket 60. Such a welding system may consist of a heating element, RF coil, microwave heating apparatus, chemical reaction vessel, arc assembly or like preheat source 65 that heats a substrate or setter 70 that carries the ceramic bearing component or components 15 to be joined into a compound body 20 within a sufficiently sealed or isolated vessel 75 so as to prevent reaction with air, carbon, hydrogen or other unwanted reactive species. The preheat source 65 may also be the heat source 80 the component or components to be joined directly such as in microwave, RF, or photon heating. Some ionic solids precursor bodies 15 will gain electrical conductivity with increased temperature and require preheating 30 before an arc can be formed between the electrode 50 and the ionic solid body 15.

After preheating 30, arc welding 10 is typically accomplished using a non-consumable electrode 50 with negative polarity (DC) or AC (or, occasionally, positive (DC) polarity). The arc 80 may also be initiated by a consumable electrode 50, generally with positive polarity (DC) or high current AC, consisting of any pure element, alloy, or ceramic bearing composite or monolith. Energy input by one of the aforementioned preheating techniques 65 may continue or discontinue depending on the ceramic properties and the heat input 40 required to generate the required fusion zone 45.

After welding, the ceramic component 20 is cooled in a controlled manner 35 to minimize thermal shock. Controlled cooling 35 enables stress relief, which occurs rapidly above $T_H \approx 0.5$ and more slowly below $T_H \approx 0.5$. Stress relief for minimizing or eliminating cracks is accomplished by a controlled post-weld thermal profile 35, such as a single or series of isothermal holds or a slow cool through $0.5T_H$. Typically, heating and cooling ramp rates are kept at or below about ten degrees per minute; more typically, below about five degrees per minute, and still more typically below about two degrees per minute.

Figure 1:
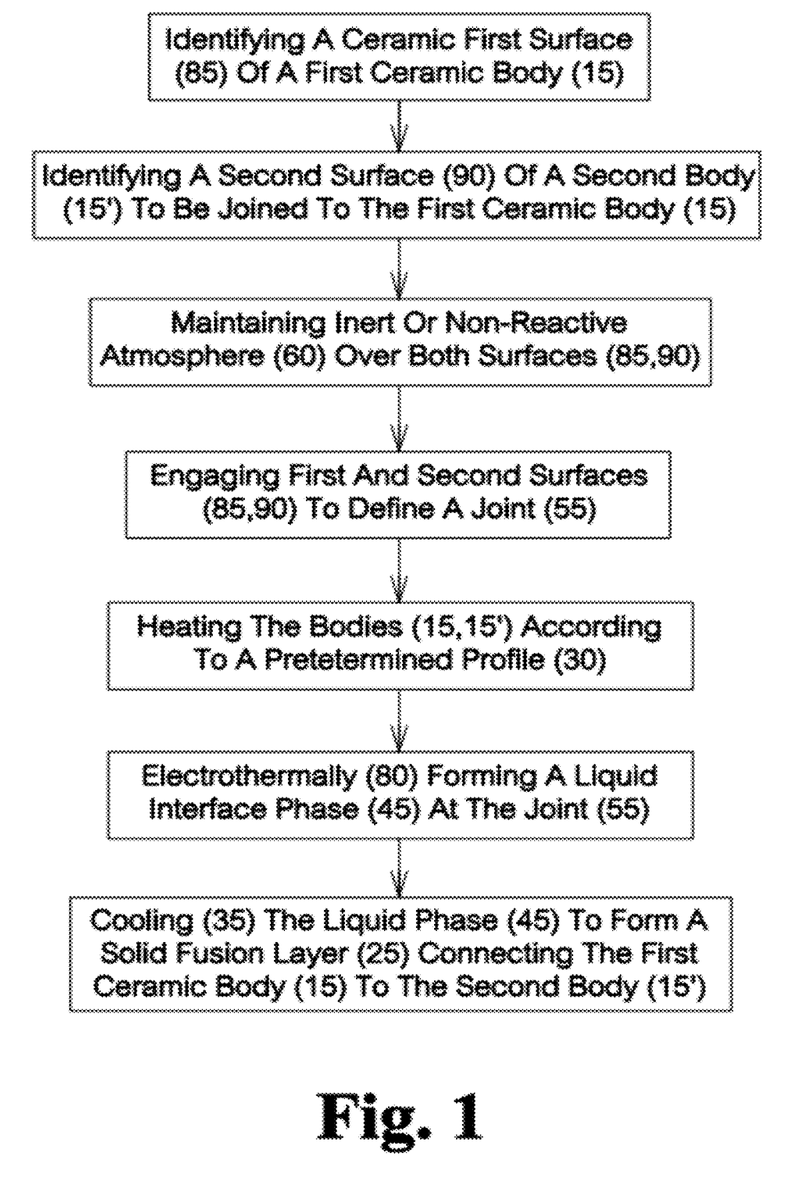
FIG. 1 is a schematic view of the welding of ceramic bodies according to a first embodiment of the present novel technology.
Figure 2:
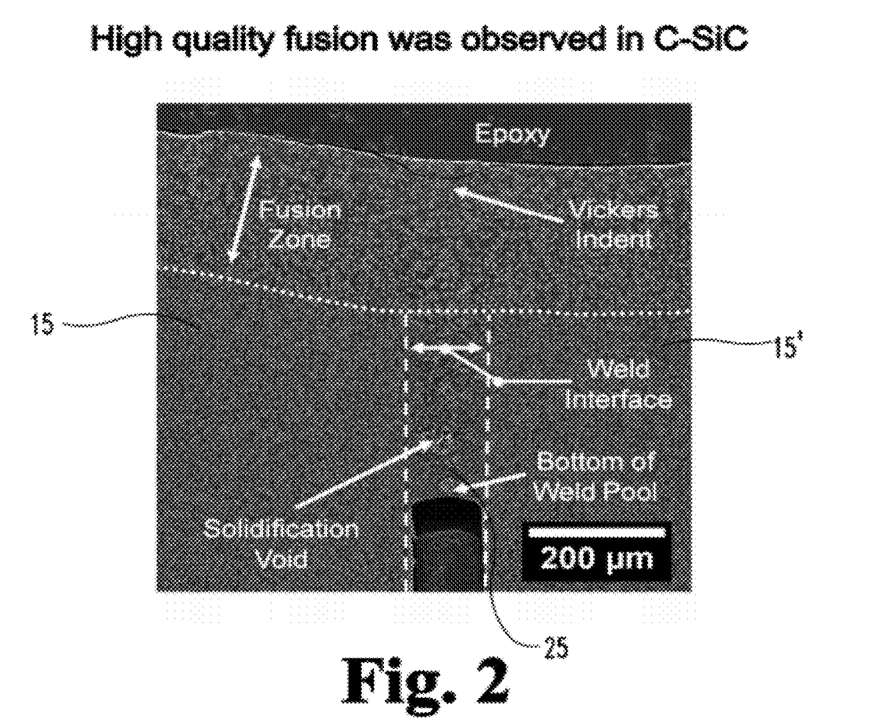
FIG. 2 is an enlarged sectional view of a weld of the embodiment of FIG. 1.
Figure 3:
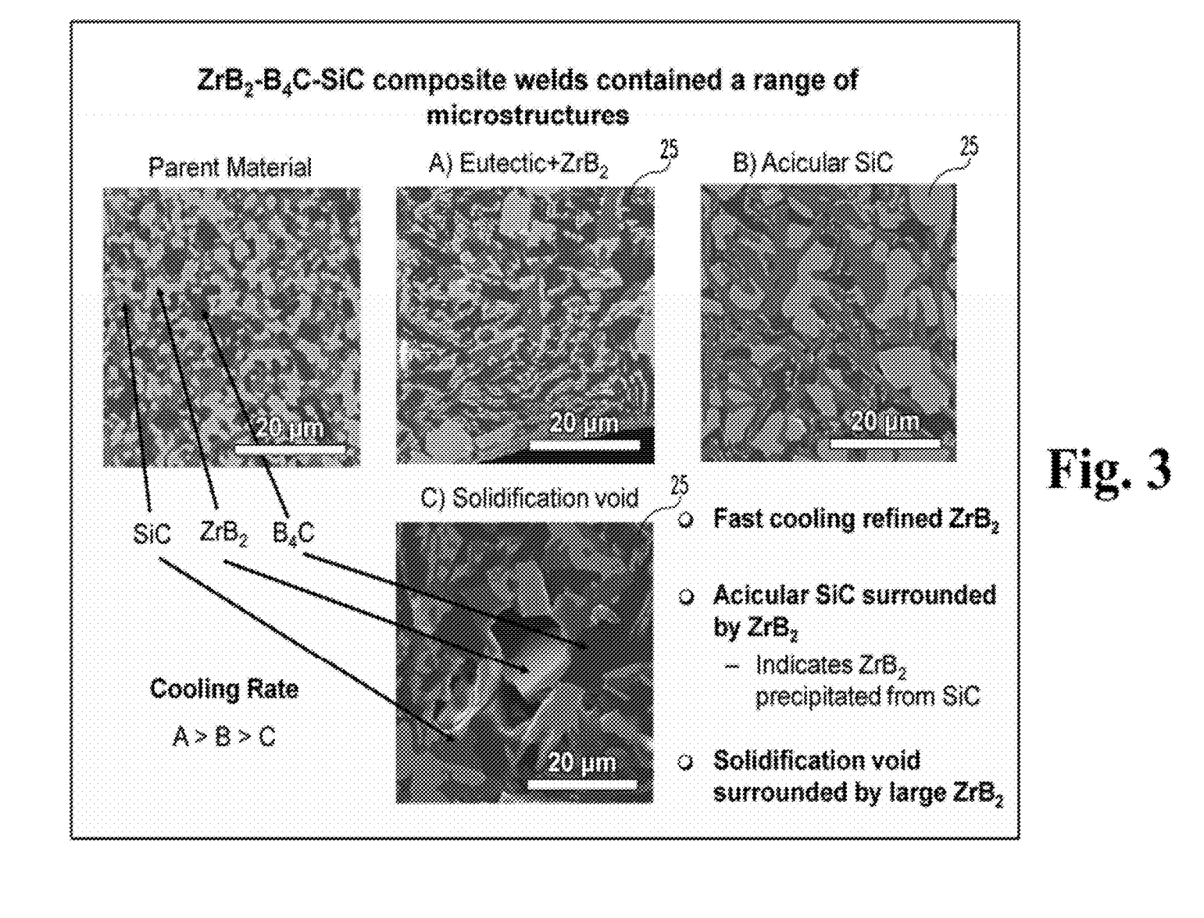
FIG. 3 is a set of photomicrographs showing sectional views of the microstructure of welds of the embodiment of FIG. 1.
Figure 4:
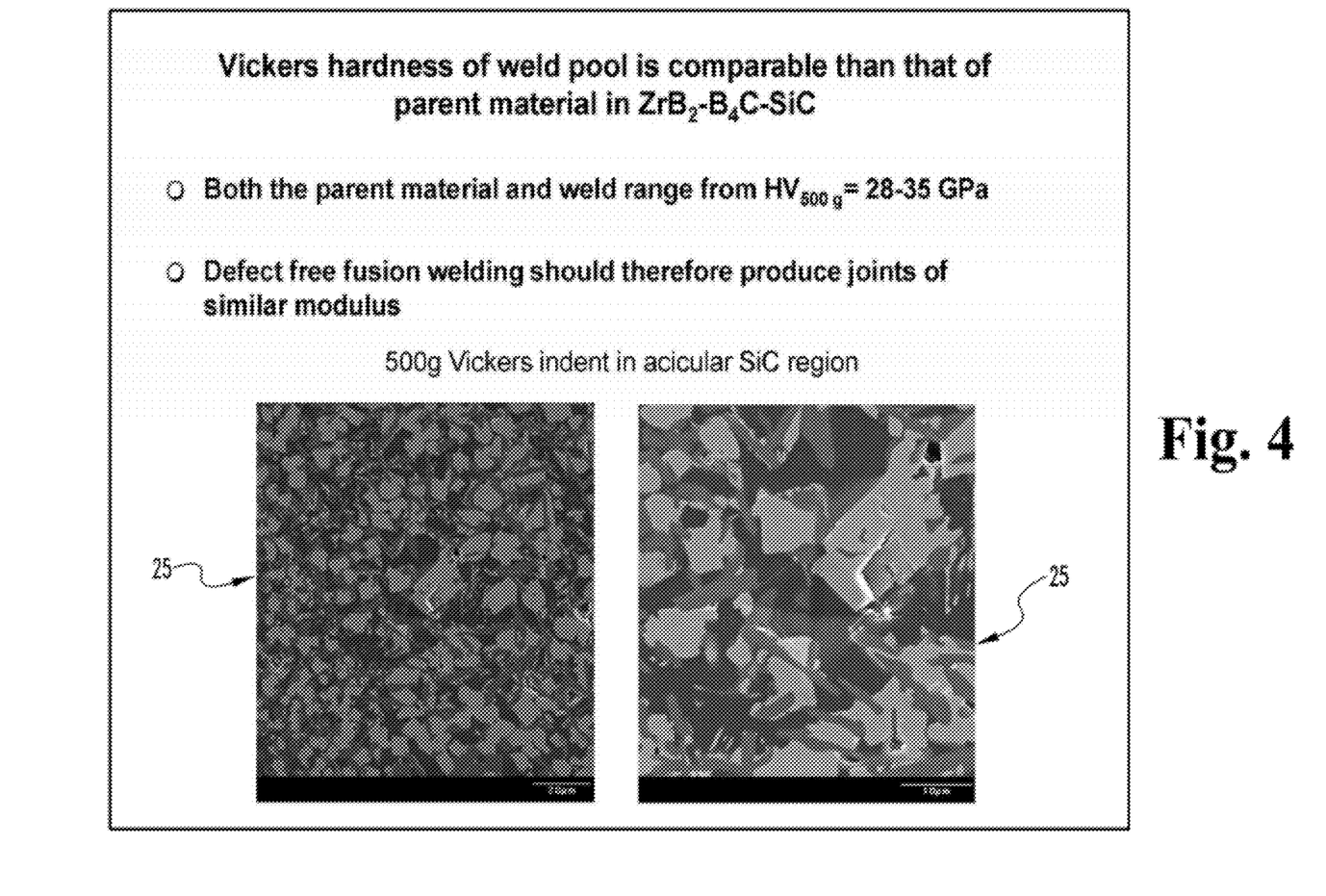
FIG. 4 is a second set of photomicrographs showing sectional views of the microstructure of welds of the embodiment of FIG. 1.
Figure 5:
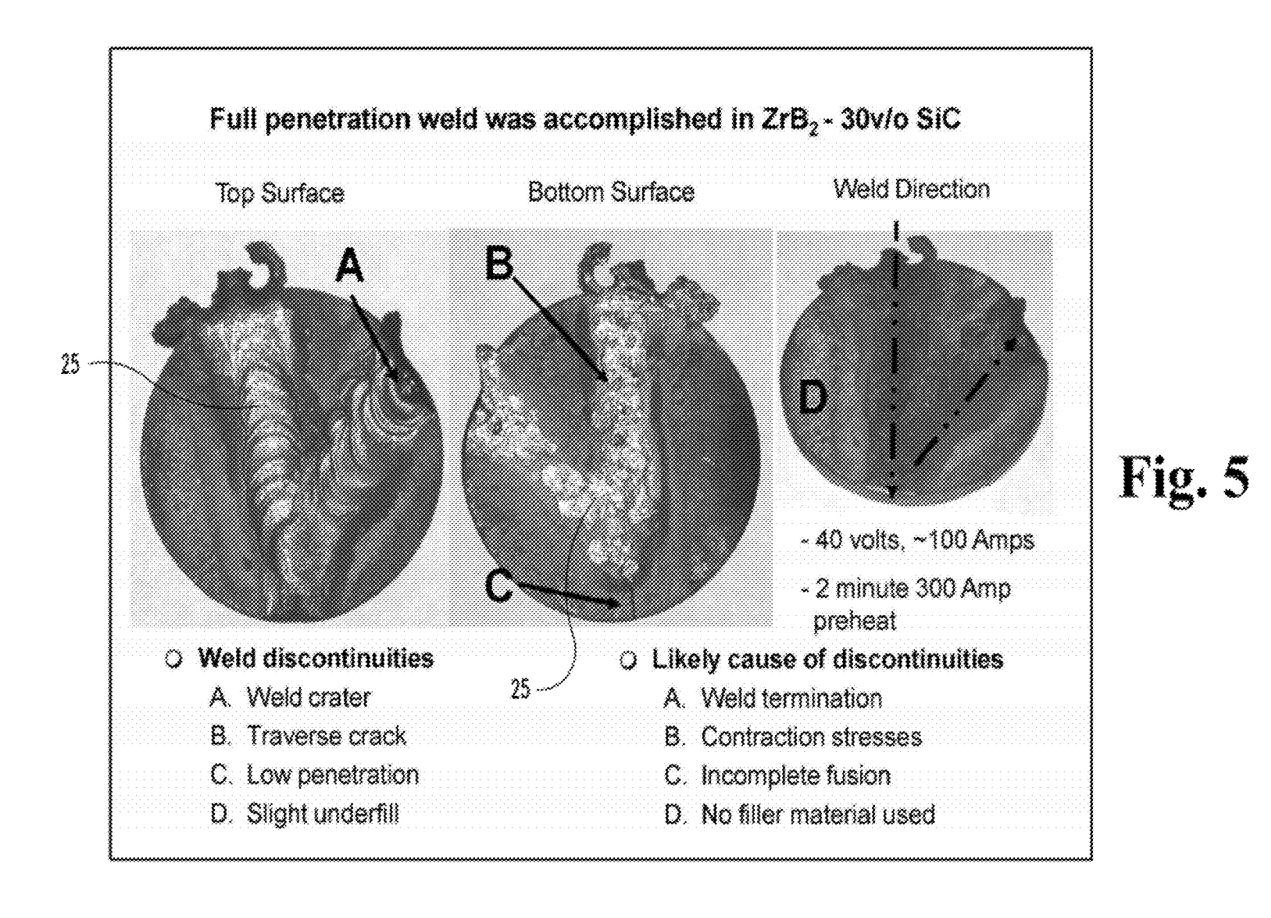
FIG. 5 is a front elevation view of welds of the embodiment of FIG. 1.
Figure 6:
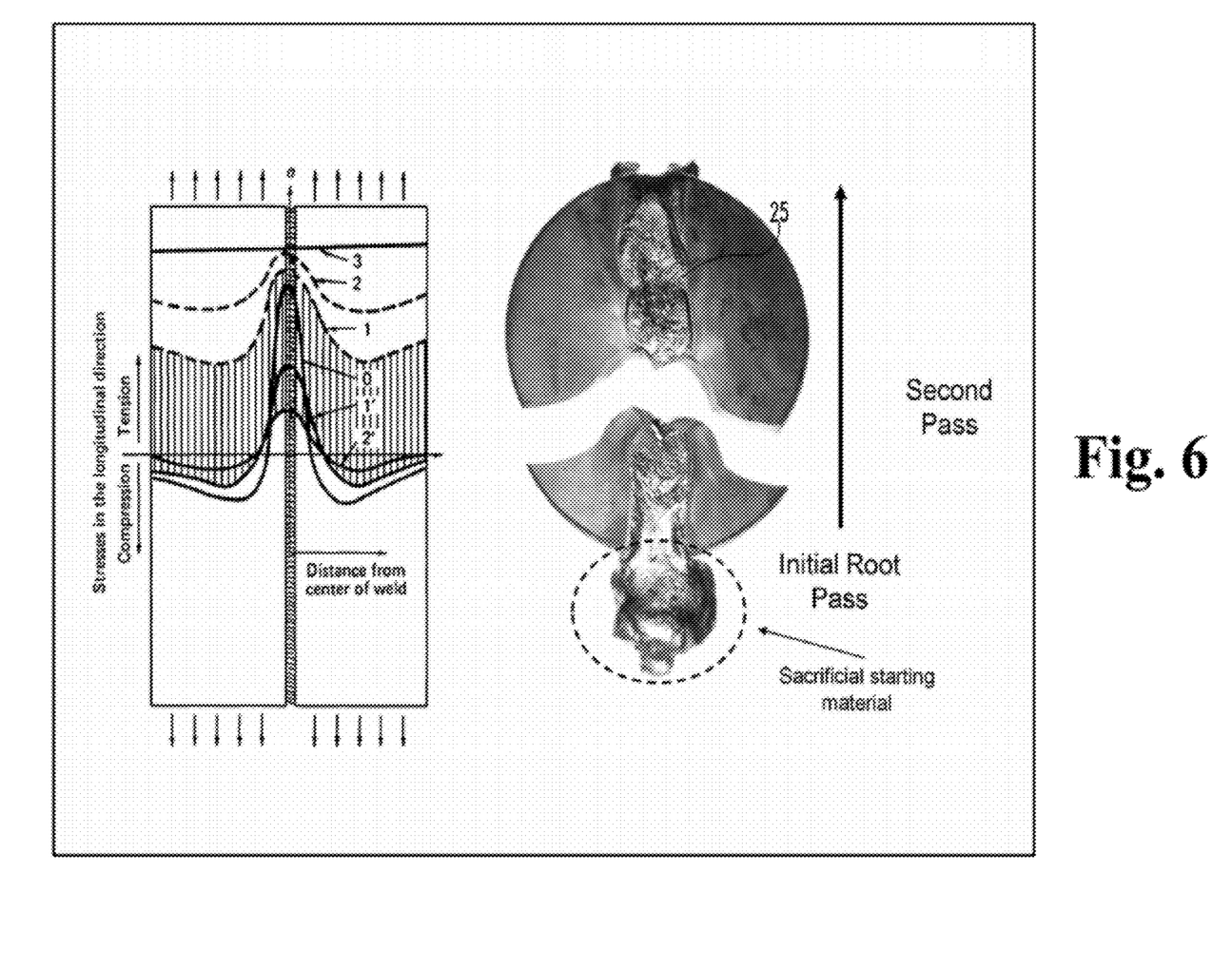
FIG. 6 is a graphical view of a tensile strength measurement of one of the welds of FIG. 1.
Figure 7:
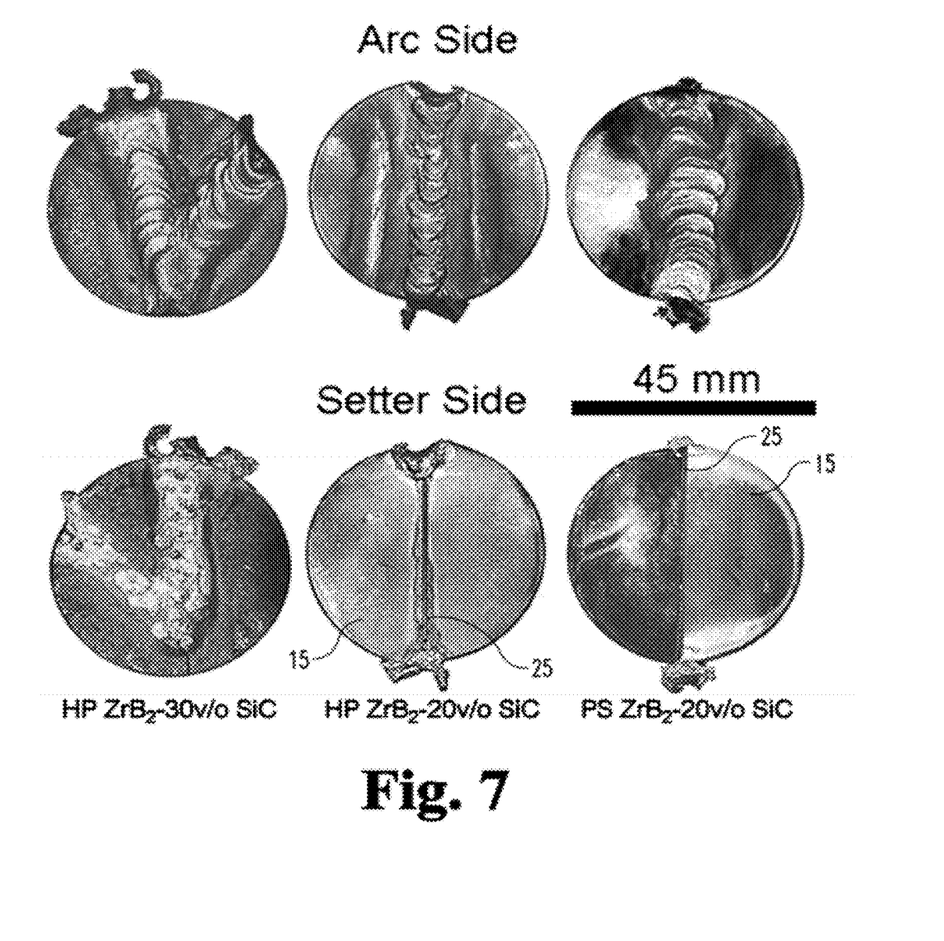
FIG. 7 is a third set of photomicrographs showing sectional views of the microstructure of welds of the embodiment of FIG. 1.
Figure 8:
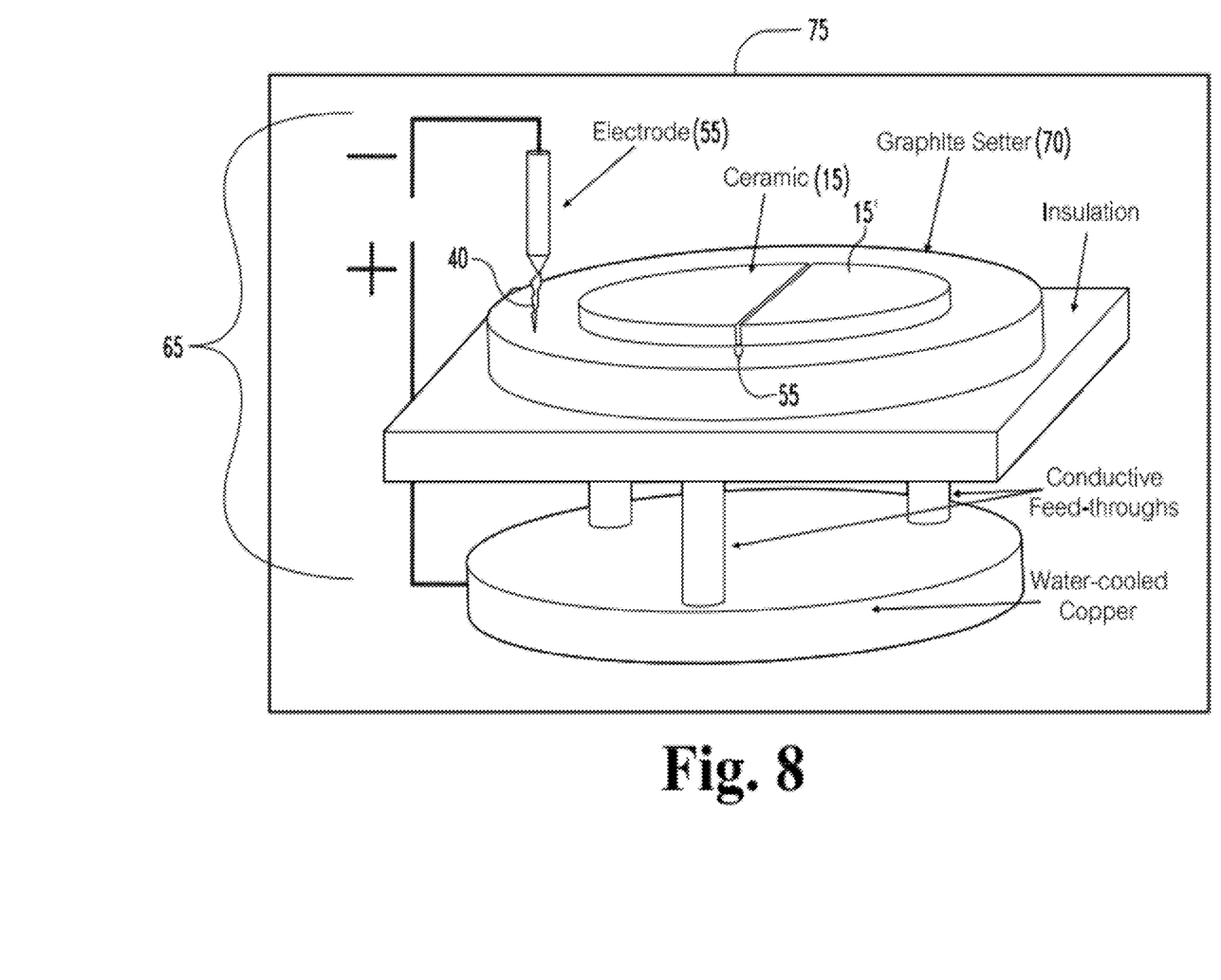
FIG. 8 is a schematic view of a welding apparatus according to the embodiment of FIG. 1.

Three examples of successful ceramic welds are shown in FIG. 7. Hot pressed (HP) $ZrB_2$-30 v/o SiC, HP $ZrB_2$-20 v/o SiC, and pressurelessly sintered (PS) $ZrB_2$-20 v/o SiC were all welded to themselves (i.e., two precursor bodies 15 of the same material were welded together to yield one compound body 20) by creating a fusion zone 45 via tungsten electric arc 80. The fusion zone 45 was generated by first preheating 30 diamond cut 45 mm diameter billets 15 to approximately 1650K. The precursor ceramic body 15 was placed on a substrate 70 and preheating 30 of the ceramic body 15 was accomplished through conduction of heat from the graphite setter 70, absorption of photons generated by an arc 40, and conduction and convection of heated gases. Preheat 30 was accomplished by arc 40 heating a 89 mm round by 25 mm thick graphite substrate 70 for 120 seconds using a 300 Amp arc 40 discharged from a 6.35 mm round tungsten electrode 50 (see FIG. 8). The arc 65 was moved in a circular motion until the preheat temperature was reached (~120 seconds at 300 Amps). Immediately after preheating 30, the arc 40 current was reduced to below 200 Amps and the fusion zone 45 was created by moving the arc 80 toward the ceramic joint 55. The sectioned billets 15 were joined by maintaining a stable 2-6 mm long arc 80 between the electrode 50 and the billet 15 for between about 30 and about 60 seconds. The average weld rate was approximately 1.5 linear mm per second when performed at 110-120 Amps. Greater weld penetration may be achieved with slower weld rates. Increases to arc power tend to generate macrovoids in the weld pool of $ZrB_2$—SiC, $ZrB_2$—$B_4C$, and $ZrB_2$—$B_4C$—SiC composites 20.

The weld 25 typically has between 20 and 110 percent of the strength or elastic modulus of the precursor materials 15, 15', more typically at least about 50 percent; still more typically at least about 70 percent; yet more typically at least about 80 percent; and still more typically at least about 90 percent the strength or elastic modulus of the precursor materials 15, 15'.

In operation, a ceramic to ceramic or ceramic to metal welded joint or weld 25 may be produced by first identifying a ceramic first precursor surface 85 of a first ceramic body 15 and a second precursor surface 90 of a second structural material (ceramic, metal, or the like) body 15' to be bonded together. Typically, a non-oxidizing atmosphere 60 is maintained over the first and second surfaces 85, 90. The precursor surfaces 85, 90 are typically preheated substantially to a temperature wherein the $T_H$ of the first precursor body 15 is at least about 0.3 (more typically between 0.4 and 0.5) according to a predetermined temperature profile 30 to bring the precursor bodies 15, 15' to a an elevated temperature lower than the fusion temperature without warping and/or cracking the bodies 15, 15'. The first and second surfaces 85, 90 are engaged to define an unwelded joint 55, and an electric arc 80 is generated between an electrode 50 and the joint 55 to produce a liquid phase or fusion zone 45. The fusion zone 45 is a region of liquid or quasi-liquid material extending between and connecting the solid portions of both precursor bodies 15, 15'. After the fusion zone 45 is formed, the liquid phase 45 is cooled, typically following a predetermined post-weld thermal profile 35, to yield a solid fusion layer or joint 25, wherein the first and second surfaces 15, 15' are joined in the fusion layer 25. The fusion zone 45 typically has a width of at least about 0.5 centimeters and yields a fusion bond or joint 25 of about the same width. The joint 25 is contiguous with the first and second bonding surfaces 85, 90 and respective bodies 15, 15', joining the same to yield a compound body 20.

In some cases, the precursor bodies 15, 15' are formed from the same ceramic material, while in others they are formed from different ceramic materials and in still other cases the first surface 85 is a ceramic while the second surface 90 is a non-ceramic, more typically a metal. More generally, the first and second electrically conductive materials 15, 15' are selected from the group including metal carbides, metal diborides, metal silicides, metal nitrides, cermets, particle composites, metals and combinations thereof. Also, the non-oxidizing atmosphere 60 may be an inert atmosphere, but it is more typically a reducing atmosphere. Typical gases making up the atmospheric blanket 60 are hydrogen, ammonia, argon, radon, xenon, helium, neon, krypton, and mixtures thereof.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A fusion bond between a first electrically conductive ceramic material and a second, different electrically conductive material, comprising:

a first electrically conductive ceramic material layer;
a second electrically conductive material layer; and
a weld layer joining the first electrically conductive ceramic material layer and second electrically conductive material layer;
wherein the first electrically conductive ceramic material layer, the second electrically conductive layer, and the weld layer are substantially annealed of thermally-induced stress; and
wherein the weld layer has an elastic modulus at least about 80 percent that of the elastic modulus of the elastic modulus of the first electrically conductive ceramic material layer.

2. The bond of claim 1 wherein the first electrically conductive ceramic material layer and second electrically conductive material layers are ceramic materials of different compositions.

3. The bond of claim 1 wherein the first electrically conductive ceramic material layer and second electrically conductive material layer are selected from the group including metal carbides, metal diborides, metal silicides, metal nitrides, cermets, particle composites, metals, and combinations thereof.

4. A welded bond between a ceramic material and a second structural material, comprising:
a first ceramic layer;
a second structural material layer; and
an intermediate weld layer about 0.5 centimeters thick and free of microcracks joining the first ceramic layer and the second structural material layer;
wherein the bond is annealed of thermally-induced stress.

5. A welded bond between a ceramic material and a second structural material, comprising:
a first ceramic layer;
a second structural material layer; and
an intermediate weld layer about 0.5 centimeters thick and free of microcracks joining the first ceramic layer and the second structural material layer;
wherein the second structural material is a ceramic; and
wherein the intermediate weld layer has an elastic modulus at least 80 percent that of the elastic modulus of the first ceramic layer.

* * * * *